(12) United States Patent
Mastrolia (10) Patent No.: US 7,578,472 B2
(45) Date of Patent: Aug. 25, 2009

(54) AIRCRAFT EJECTION SEAT SYSTEM

(75) Inventor: Brad Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 468 days.

(21) Appl. No.: 11/445,881

(22) Filed: Jun. 2, 2006

(65) Prior Publication Data

US 2009/0072087 A1   Mar. 19, 2009

(51) Int. Cl.
*B64D 25/102* (2006.01)

(52) U.S. Cl. ........................... 244/122 A; 244/122 AD; 60/228

(58) Field of Classification Search ............. 244/122 A, 244/122 AB, 122 AC, 122 AD, 122 AE, 141, 244/4 A, 177; 60/128, 129
See application file for complete search history.

(56) References Cited

U.S. PATENT DOCUMENTS

| | | | | |
|---|---|---|---|---|
| 2,274,734 | A * | 3/1942 | Esnault-Pelterie | ............ 60/401 |
| 2,829,850 | A * | 4/1958 | Culver | ......................... 244/141 |
| 3,302,633 | A * | 2/1967 | Vykukal | ..................... 600/20 |
| 3,362,662 | A | 1/1968 | McIntyre et al. | |
| 3,487,445 | A * | 12/1969 | McIntyre et al. | ...... 244/122 AD |
| 3,592,419 | A * | 7/1971 | Hantzsch | ............... 244/122 AD |
| 3,814,017 | A * | 6/1974 | Backstein et al. | ........... 102/215 |
| 3,979,089 | A | 9/1976 | Miller et al. | |
| 4,216,928 | A | 8/1980 | Hooper et al. | |
| 4,236,687 | A | 12/1980 | Stone et al. | |
| 4,303,212 | A | 12/1981 | Stone et al. | |
| 4,395,001 | A | 7/1983 | Stone et al. | |
| 4,470,565 | A | 9/1984 | Zenobi et al. | |
| 4,483,411 | A * | 11/1984 | Mifsud | ........................ 181/120 |
| 4,505,444 | A | 3/1985 | Martin | |
| 4,592,523 | A | 6/1986 | Herndon | |
| 4,667,903 | A | 5/1987 | Herndone | |
| 4,673,147 | A * | 6/1987 | Solomonides | ............ 244/122 A |
| 4,706,909 | A * | 11/1987 | Cuevas et al. | ......... 244/122 AC |
| 4,721,273 | A | 1/1988 | Trikha | |
| 4,749,154 | A * | 6/1988 | Herndon et al. | ....... 244/122 AB |
| 5,078,051 | A * | 1/1992 | Amundson | .................. 102/206 |
| 5,261,630 | A | 11/1993 | Aronne | |
| 6,085,629 | A * | 7/2000 | Thiesen et al. | ................. 89/6.5 |
| 6,591,602 | B1 * | 7/2003 | Ruff | ............................ 60/229 |

FOREIGN PATENT DOCUMENTS

| | | |
|---|---|---|
| GB | 1174464 A | 12/1969 |
| RU | 2101217 C1 | 10/1998 |

* cited by examiner

*Primary Examiner*—Michael Carone
*Assistant Examiner*—Benjamin P Lee
(74) *Attorney, Agent, or Firm*—Jerry J. Holden; John D. Titus (57) ABSTRACT

An ejection seat having pitch, roll, and yaw control provided by three separate rocket motors where each rocket motor has a fixed nozzle and the entire rocket motor is rotated about a single axis corresponding to the minimum principal moment of inertia of the rocket. Actuation for each rocket motor is by means of a hydraulic rack and pinion actuator. Power for the hydraulic actuators is provided by a unique hydro-pneumatic amplifier that converts stored gas energy into pressurized hydraulic fluid. The high pressure hydraulic fluid is directed through conventional servo valves into the appropriate actuators to provide main, roll, pitch, and yaw thrust as required to achieve upright orientation and vertical flight.

15 Claims, 5 Drawing Sheets

AIRCRAFT EJECTION SEAT SYSTEM

BACKGROUND OF THE INVENTION

This invention relates to aircraft escape systems, in particular to aircraft ejection seats.

Ejection seats in high performance military aircraft must be capable of safely removing the pilot or other occupant from the stricken aircraft across a wide variety of aircraft speed regimes, altitudes and aircraft attitudes. The most difficult ejection occurs when the aircraft is at low altitude and at an inverted or other non-upright orientation. Approximately 50% of the United States Air Force fighter aircraft ejection fatalities occur due to insufficient altitude at the time of ejection. Without sufficient altitude, the occupant's recovery parachute cannot fully deploy to bring the occupant safely to the ground.

It has long been recognized that an aircraft ejection seat having the capability of assuming an upright orientation irrespective of the aircraft attitude and thereafter gaining sufficient altitude for a safe parachute deployment would be desirable for reducing ejection fatalities. U.S. Pat. No. 4,216,928 to Hooper, et al. discloses a microwave radiometric attitude reference system that uses microwave radiometry to sense the orientation of the ejection seat. Pitch and roll of the ejection seat are controlled by a linear pitch servo actuator and a linear roll servo actuator that move a single gimbal-mounted rocket motor.

U.S. Pat. No. 4,303,212 to Stone, et al. discloses an aircraft ejection seat that includes an attitude control processor, which processes signals from three attitude sensors and uses those signals to control a pair of servo valves. The servo valves actuate a linear pitch servo and a linear roll servo that act on a gimbal-mounted spherical rocket motor.

U.S. Pat. No. 4,721,273 to Trikha discloses an aircraft ejection seat in which the main thrusters have steerable nozzles for the purpose of changing the direction of the thrust axis. The ejection seat also includes a pair of fixed, opposed roll control thrusters and a pair of fixed pitch control thrusters that operate together to maintain the ejection seat in an upright orientation.

U.S. Pat. No. 4,236,687 discloses an aircraft ejection seating having pitch, roll and yaw control. The ejection seat includes two spherical gimbal-mounted rocket motors each of which is acted on by two linear hydraulic actuators. Pitch and roll are controlled by varying the position of the two rocket motors in unison. Yaw control is accomplished by positioning the rocket motors so that the thrust vectors are not parallel, which produces a torque about the yaw axis of the ejection seat.

Although linear actuators acting on large spherical rocket motors could theoretically accomplish the desired pitch, roll and yaw control, in practice the large moment of inertia of the spherical rocket motor necessitates very large and powerful linear actuators to move the rocket motors to maintain stable flight. Large powerful hydro-pneumatic actuators, in turn, are heavy and require substantial power to operate, which leads to a heavier ejection seat which requires a larger rocket motor, necessitating more powerful hydro-pneumatic actuators and so on. Accordingly, what is needed is an ejection seat with pitch, roll and yaw control that incorporates low moment of inertia rockets and actuators in order to meet the size and weight constraints as well as reaction times necessary for the ejection seat to achieve upright stable flight.

SUMMARY OF THE INVENTION

The present invention comprises a maneuvering ejection seat for an aircraft in which the rocket motor has a fixed nozzle and the entire motor is rotated about a single axis. According to an illustrative embodiment of the invention, the main rocket motor is substantially cylindrical in shape and terminates at a fixed nozzle that is canted relative to the longitudinal axis of the rocket motor. The rocket motor is mounted with its longitudinal axis substantially vertical along the seat back portion of the ejection seat. The upper end of the rocket motor is supported by a thrust bearing that allows the main rocket motor to be pivoted about its longitudinal axis. A hydraulic rack-and-pinion actuator pivots the main rocket about its longitudinal axis. Pivoting of the main rocket about its longitudinal axis provides yaw control as well as vertical thrust.

In addition to the main rocket, the illustrative ejection seat has a pitch control rocket and a roll control rocket. The pitch control rocket comprises a substantially cylindrical rocket motor with a fixed nozzle that has a thrust axis substantially orthogonal to the longitudinal axis of the rocket motor. The pitch control rocket is mounted with its longitudinal axis substantially orthogonal to the forward-facing direction of the seat. The pitch-control rocket is also pivoted about its longitudinal axis by a hydraulic rack-and-pinion actuator.

Finally, in addition to the main rocket and the pitch control rocket, the illustrative ejection seat has a roll control rocket. The roll control rocket comprises a substantially cylindrical rocket motor with a fixed nozzle orthogonal to the longitudinal axis the rocket motor. The roll control rocket is mounted to the ejection seat with its longitudinal axis oriented along the forward facing direction of the ejection seat. In a preferred embodiment, because of space constraints, the roll control rocket may comprise two smaller rocket motors with parallel nozzles. As with the main rocket and the pitch control rocket, the roll control rockets are pivoted about their longitudinal axes by means of a hydraulic rack-and-pinion actuator. Power for the hydraulic actuators is provided by a unique hydro-pneumatic pressure source. The pressure source comprises a pressure vessel containing a pressurized gas such as helium or nitrogen with a pyrotechnically actuated valve. Upon initiation, the pressurized gas flows from the pressure vessel into the input end of a hydro-pneumatic amplifier. The hydro-pneumatic amplifier consists of a free-floating piston contained in a bore separating a supply of hydraulic fluid from the pressurized gas. Depending on the shape of the piston, the hydraulic fluid can be pressurized to a pressure greater than, equal to, or less than the gas pressure. The high pressure hydraulic fluid is directed through conventional servo valves into the appropriate hydraulic rack-and-pinion actuators to provide the appropriate main, roll, pitch, and yaw thrust as required to achieve upright orientation and vertical flight.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate the general manner of construction and are not necessarily to scale. In the detailed description and in the drawing figures, specific illustrative examples are shown and herein described in detail. It should be understood, however, that the drawing the figures and detailed description are not intended to limit the invention to the particular form disclosed, but are merely illustrative and intended to teach one of ordinary skill how to make and/or use the invention claimed herein and for setting forth the best mode for carrying out the invention.

Figure 1:
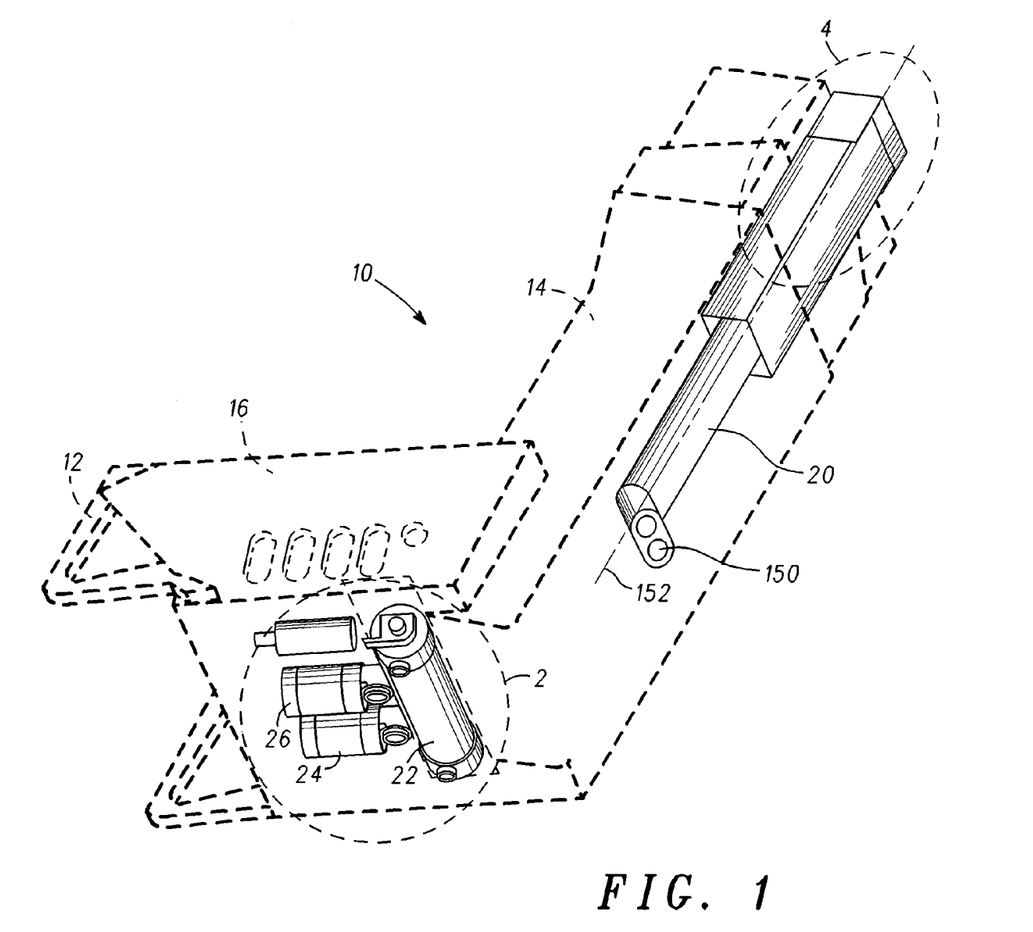
FIG. 1 is a perspective view of an ejection seat incorporating features of the present invention.

With reference to FIG. 1, an ejection seat 10 comprises a seat frame 12 supporting a back portion 14 and a seat portion 16 for supporting an aircraft occupant (not shown). Ejection seat 10 includes a main rocket motor 20, a pitch control rocket motor 22, and a pair of tandem roll control rocket motors 24 and 26. In the illustrative embodiment of FIG. 1, main rocket motor 20 comprises a conventional United Air Force CKU-5 rocket catapult motor.

Figure 2:
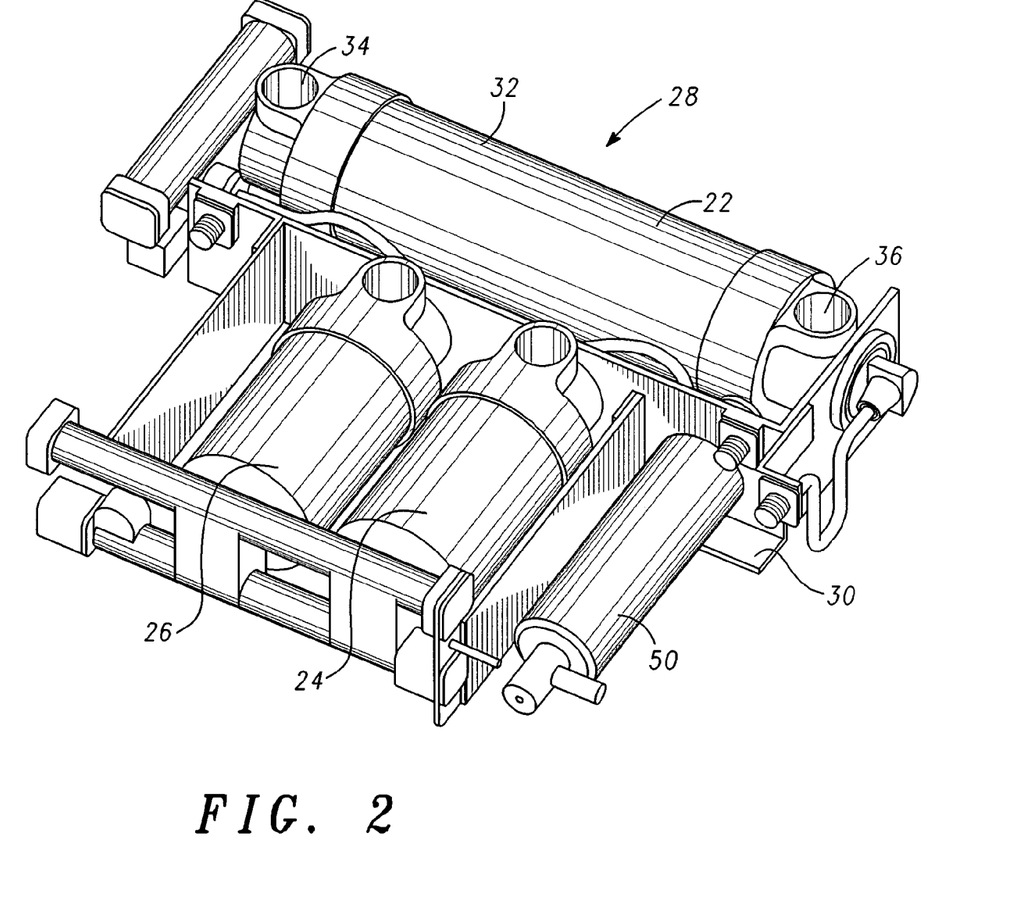
FIG. 2 is a perspective view of the pitch and roll control motor assembly on the ejection seat of FIG. 1.
Figure 3:
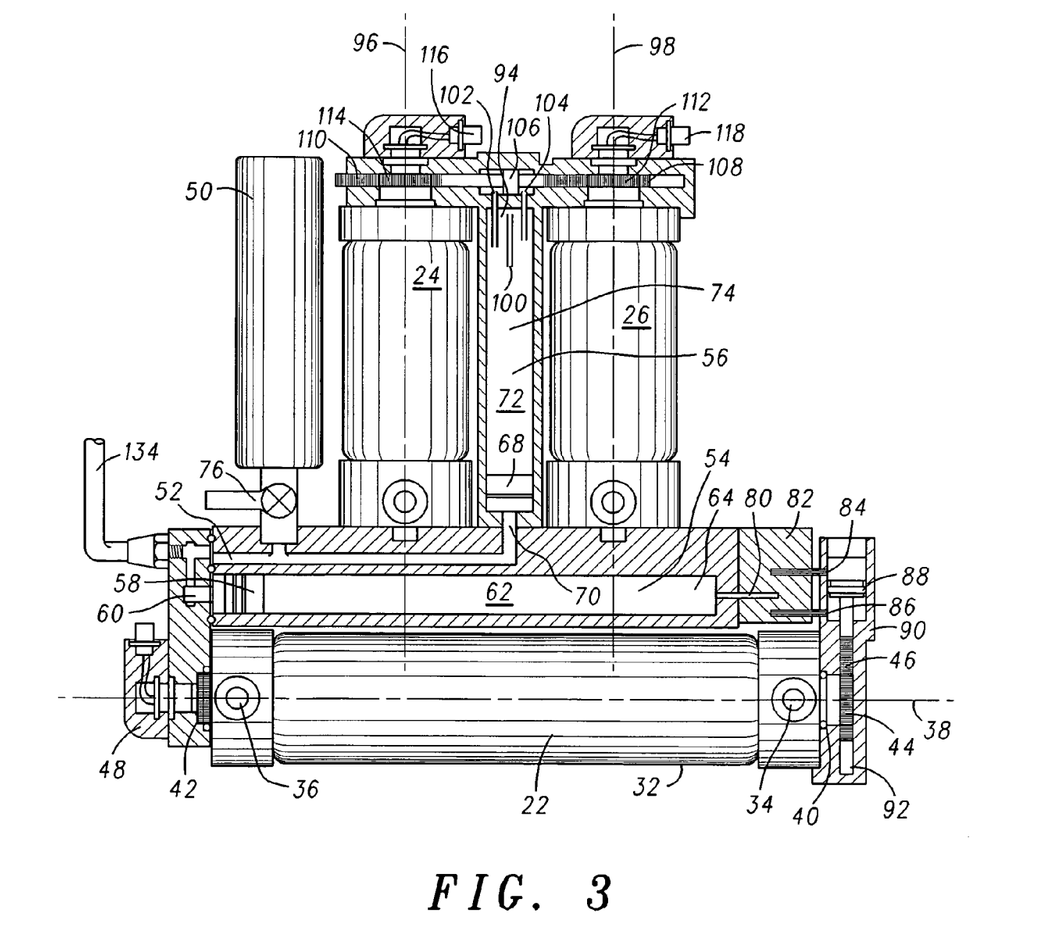
FIG. 3 is a bottom view, partially cut away of the pitch and roll control rocket motor assembly of FIG. 2.

With additional reference to FIGS. 2 and 3, the pitch and roll control unit 28 comprises pitch control motor 22 and roll control motors 24, 26 supported by a frame 30 which is mounted to seat portion 16 of ejection seat 10. Pitch control rocket motor 22 comprises a conventional solid propellant rocket grain contained within a cylindrical housing 32. Pitch control rocket motor 22 further comprises nozzles 34 and 36 located at opposite ends of cylindrical housing 32. Nozzles 34 and 36 have thrust axes that are orthogonal to the longitudinal axis 38 of pitch control rocket motor 22. Pitch control motor 22 is supported by low friction bearings 40, 42 located at either end of pitch control rocket motor 22. Low friction bearings 40, 42 enable pitch control rocket motor 22 to be pivoted quickly about its longitudinal axis 38. Pitch control rocket motor 22 is pivoted about it longitudinal axis by means of a pinion gear 44 attached to one end of cylindrical housing 32 which is driven by a rack gear 46 in a manner more fully described hereinafter. A position sensor 48, which comprises a conventional potentiometer, optical encoder or similar device provides position feedback to the ejection seat avionics (not shown).

Pitch and roll control unit 28 further comprises a pressure vessel 50 which is connected via a manifold 52 to hydro-pneumatic amplifiers 54 and 56. Hydro-pneumatic amplifier 54 comprises a piston 58 which separates inlet port 60 from a quantity of hydraulic fluid 62 contained within the bore 64 of hydro-pneumatic amplifier 54. Similarly, hydro-pneumatic amplifier 56 comprises a piston 68 separating inlet port 70 from a quantity of hydraulic fluid 72 contained within bore 74 of hydro-pneumatic amplifier 56. Pressure vessel 50 is charged with high pressure gas such as nitrogen or helium to a pressure of 5000 psi. The stored energy available in the pressurized gas is sufficient to operate the servo mechanisms for the duration of the ejection seat flight.

In operation, upon receipt of a signal to eject, as the main rocket motor 20 is firing, pyrotechnic valve 76 opens to release the pressurized gas into manifold 52 where it acts against piston 58 causing piston 58 to pressurize hydraulic fluid 62 to an equal pressure. Note that although in the illustrative embodiment the gain of hydro-pneumatic amplifier is one, by using a stepped bore and a piston having two diameters, the gain of hydro-pneumatic amplifier 54 can be greater than or less than one depending on the application desired. Pressurized hydraulic fluid 62 then flows out of hydro-pneumatic amplifier 54 into inlet port 80 of servo valve 82. Servo valve 82 then directs the high pressure fluid to one of two outlet ports 84, 86, which causes the high pressure fluid to act on piston 88 of actuator 90 to move rack gear 46 in and out of bore 92 of actuator 90. The linear motion of rack gear 46 is transformed into rotary motion of pitch control rocket motor 22 by interaction of rack gear 46 with pinion 44. In the preferred embodiment, the hydraulic fluid 62 is a conventional MIL-H-5606G hydraulic fluid. The servo valve 82 is preferable a high frequency hydraulic servo valve such as a HR Textron model 25A servo valve. The pressure vessel 50 is preferably a welded high pressure vessel such as manufactured by Conax Florida.

Because of fore-aft space constraints, rather than a single roll control rocket motor, a pair of roll control rocket motors 24, 26 are used in the illustrative embodiment. As with pitch control rocket motor 22, roll control rocket motors 24, 26 are supported by low friction bearings to enable them to pivot about their longitudinal axes 96 and 98 respectively. As with pitch control rocket motor 22, when pyrotechnic valve 76 opens, high pressure gas in manifold 52 acts on piston 68 of hydro-pneumatic amplifier 56 pressurizing hydraulic fluid 72 contained therein. High pressure hydraulic fluid 72 then enters inlet port 100 of servo valve (shown schematically as reference 94) which directs it to one of two outlet ports 102, 104 to act on a double acting piston 106 which moves a pair of rack gears 108, 110. Rack gears 108, 110, in turn act on corresponding pinion gears 112, 114 to rotate roll control rocket motors 24, 26 in unison. Position feedback is provided by position sensors 116 and 118 which comprise conventional potentiometers optical encoders or the like.

Figure 4:
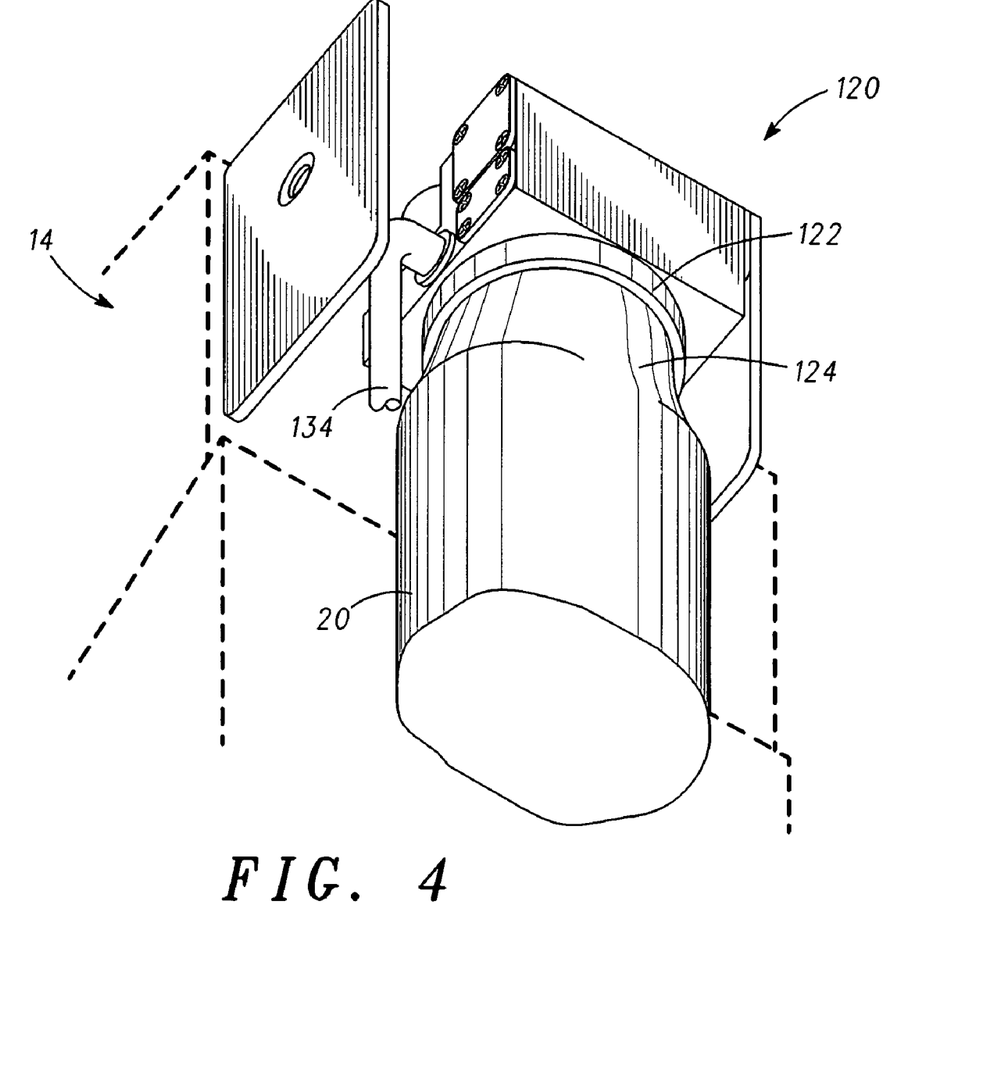
FIG. 4 is an enlarged view of the upper portion of the ejection seat encircled in FIG. 1, partially cut away.
Figure 5:
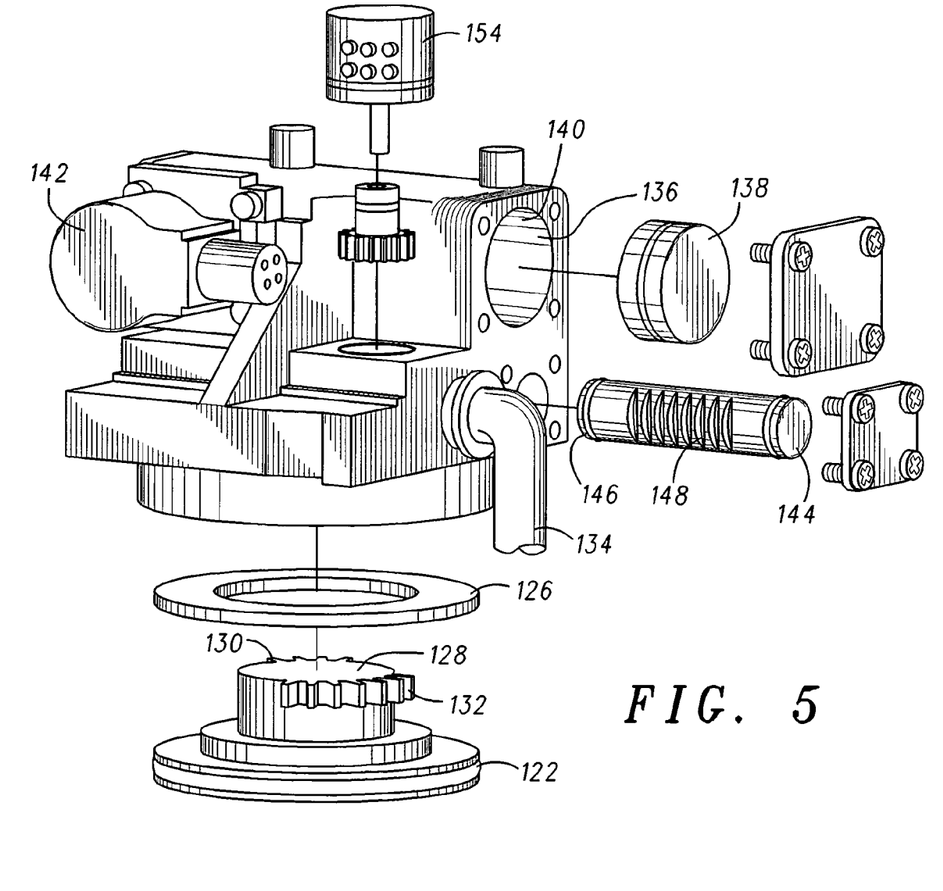
FIG. 5 is an exploded, perspective view of the yaw actuator shown in FIG. 4.

With reference to FIGS. 4-6, yaw control is provided by a yaw control module 120 located near the upper end of back portion 14 of ejection seat 10. FIG. 4 is an enlarged view of the portion of FIG. 1 circled with reference numeral 4 cutaway to show the detail of yaw control module 120. Yaw control module 120 comprises a thrust collar 122 which attaches rigidly to upper portion 124 of main rocket motor 20. Thrust collar 122 is supported by a low friction thrust bearing 126. A pinion gear 128 is integral to thrust collar 122. Pinion 128 comprises two sector gears 130, 132 for reasons discussed more fully hereinafter.

In operation, when pyrotechnic valve 76 opens, a portion of the high pressure gas entering manifold 52 is directed through tube 134 into the inlet port of hydro-pneumatic amplifier 136. Piston 138 of hydro-pneumatic amplifier 136 then compresses a quantity of hydraulic fluid (not shown) within the bore 140 of hydro-pneumatic amplifier 136. The high pressure fluid is then directed via servo valve 142 to either end 144, 146 of a piston-rack combination 148 which meshes with sector 130 of pinion gear 128. The linear motion of piston-rack combination 148 is converted into rotary motion of thrust collar 132 by interaction of piston rack 148 and pinion gear 128. Because the nozzle 150 of main rocket motor 20 is canted at an oblique angle to the longitudinal axis 152 of main rocket motor 20, main rocket motor has both a vertical and horizontal component to its thrust vector. Accordingly, rotating main rocket motor 20 about its axis provides a torque about the yaw axis of ejection seat 10. Position feedback of main rocket motor 20 is provided by position sensor 48 which also comprises a conventional position sensor such as a potentiometer optical encoder or the like which meshes with sector 132 of pinion gear 128.

Because the rocket motors of the present invention are rotated about their longitudinal axes, the moment inertia of the rocket motors is minimized, which in combination of the high pressure hydraulic actuators, enables the rocket motors to pivot with a 20-25 Hertz response time. With a 20-25 Hertz response time for each of the rocket motors in the ejection seat of the present invention, the present invention is capable of assuming and maintaining stable flight in spite of the inherent aerodynamic instability of the ejection seat itself.

Although certain illustrative embodiments and methods have been disclosed herein, it will be apparent from the foregoing disclosure to those skilled in the art that variations and modifications of such embodiments and methods may be made without departing from the spirit and scope of the invention. For example, although the present invention uses a hydro-pneumatic amplifier with a gain of one to supply high pressure hydraulic fluid, a conventional accumulator with a flexible diaphragm is also considered within the scope of the present invention. Additionally, although the present invention utilizes cylindrical rocket motors, any substantially cylindrical rocket motor including tapered, conical, or other body of revolution or prism shapes are considered within the scope of the present invention provided the body has a principal axis of inertia that is less than the other two axis of inertia and the smaller principal axis defines the longitudinal axis about which the rocket motor is pivoted. Accordingly, it is intended that the invention shall be limited only to the extent required by the appended claims and the rules and principals of applicable law.

What is claimed is:

1. A maneuvering ejection seat for an aircraft comprising:
a seat for supporting an aircraft occupant;
a first rocket motor having a fixed nozzle and a substantially cylindrical housing with a first longitudinal axis, said first rocket motor being mounted to said seat by a bearing allowing said first rocket motor to rotate about said first longitudinal axis, said first longitudinal axis being the sole degree of freedom about which said rocket motor rotates relative to said seat;
a sensor for determining a rotational position of said first rocket motor relative to said seat; and
a hydraulic actuator for rotating said first rocket motor about said first longitudinal axis;
a hydro-pneumatic amplifier for supplying pressurized hydraulic fluid to said hydraulic actuator, said hydro-pneumatic amplifier comprising a housing having a bore therein with an input port, an output port and a free floating piston disposed in said bore separating said input port from said output port,
a supply of hydraulic fluid contained within said bore in a region between said piston and said output port;
a source of pressurized gas fluidically connected to said input port of said hydro-pneumatic amplifier for pressurizing said supply of hydraulic fluid; and
a servo valve inter-disposed between said output port of said hydro-pneumatic amplifier and said hydraulic actuator for controlling a flow of pressurized hydraulic fluid from said a hydro-pneumatic amplifier to said hydraulic actuator.

2. The ejection seat of claim 1, wherein:
said seat comprises a back portion and a seat portion and said first longitudinal axis of said first rocket motor is oriented substantially vertically with respect to said back portion of said seat.

3. The ejection seat of claim 2, wherein:
said fixed nozzle of said first rocket motor is oriented such that the thrust of said first rocket motor is oriented along a vector that is canted on an obtuse angle relative to said first longitudinal axis.

4. The ejection seat of claim 1, wherein:
said hydraulic actuator comprises a double acting piston operatively attached to a rack gear for moving said rack gear from a first position to a second position, said rack gear being meshed with a pinion gear, said pinion gear being attached to said first rocket motor along said first longitudinal axis.

5. The ejection seat of claim 4, wherein:
said sensor comprises an electronic sensor having a drive gear meshing with said pinion gear.

6. A maneuvering ejection seat for an aircraft comprising:
a seat for supporting an aircraft occupant;
a first rocket motor having a fixed nozzle, said first rocket motor being mounted to said seat by a bearing allowing said first rocket motor to rotate about a longitudinal axis,
a sensor for determining a rotational position of said first rocket motor relative to said seat; and
a hydro-pneumatic actuator for rotating said first rocket motor about said longitudinal axis, said hydro-pneumatic actuator comprising a pressure vessel, a separate hydro-pneumatic amplifier, a servo valve, and a hydraulic actuator,
wherein said hydro-pneumatic amplifier comprises a housing having a bore therein with an input port at a first end thereof, an output port at a second end thereof and a free floating piston disposed therein separating said input port from said output port, a supply of hydraulic fluid being contained within said bore in a region between said piston and said output port,
said pressure vessel comprising a container holding a pressurized gas and having an output port fluidically interconnected with said input port of said hydro-pneumatic amplifier, said pressure vessel further comprising a normally-closed valve separating said pressurized gas from said input port of said hydro-pneumatic amplifier, said normally-closed valve responsive to an external signal for opening to allow said pressurized gas to flow through said input port and pressurize a region within said bore between said input port and said piston, whereby said supply of hydraulic fluid is pressurized by said piston acted on by said pressurized gas;
said hydraulic actuator having an input port fluidically interconnected to said output port of said hydro-pneumatic amplifier, said hydraulic actuator being operatively connected to said first rocket motor for rotating said first rocket motor about said longitudinal axis,
said servo valve being disposed between said output port of said hydro-pneumatic amplifier and said hydraulic actuator for controlling a flow of pressurized hydraulic fluid from said hydro-pneumatic amplifier to said hydraulic actuator.

7. The maneuvering ejection seat of claim 6, further comprising:
a second rocket motor having a fixed nozzle, said second rocket motor being mounted to said seat by a bearing allowing said second rocket motor to rotate about a second longitudinal axis,
a second sensor for determining a rotational position of said second rocket motor relative to said seat; and
a second hydro-pneumatic actuator for rotating said second rocket motor about said second longitudinal axis, said hydro-pneumatic actuator comprising a pressure vessel, a separate hydro-pneumatic amplifier, a servo valve, and a hydraulic actuator.

8. The maneuvering ejection seat of claim 7, further comprising:
a third rocket motor having a fixed nozzle, said third rocket motor being mounted to said seat by a bearing allowing said third rocket motor to rotate about a third longitudinal axis,
a third sensor for determining a rotational position of said third rocket motor relative to said seat; and
a third hydro-pneumatic actuator for rotating said third rocket motor about said third longitudinal axis, said hydro-pneumatic actuator comprising a pressure vessel, a separate hydro-pneumatic amplifier, a servo valve, and a hydraulic actuator.

9. A maneuvering ejection seat for an aircraft comprising:
a seat for supporting an aircraft occupant;
a first rocket motor having a fixed nozzle and a substantially cylindrical housing with a first longitudinal axis, said first rocket motor being mounted to said seat by a bearing allowing said first rocket motor to rotate about said first longitudinal axis, said first longitudinal axis being the sole degree of freedom about which said rocket motor rotates relative to said seat;
a first sensor for determining a rotational position of said first rocket motor relative to said seat;
a first hydraulic actuator for rotating said first rocket motor about said first longitudinal axis;
a first servo valve for controlling a flow of pressurized hydraulic fluid into said first hydraulic actuator;
a second rocket motor having a fixed nozzle and a substantially cylindrical housing with a second longitudinal axis, said second rocket motor being mounted to said seat by a bearing allowing said second rocket motor to rotate about said second longitudinal axis, said second longitudinal axis being the sole degree of freedom about which said second rocket motor rotates relative to said seat;
a second sensor for determining a rotational position of said second rocket motor relative to said seat;
a second hydraulic actuator for rotating said second rocket motor about said second longitudinal axis;
a second servo valve for controlling a flow of pressurized hydraulic fluid into said second hydraulic actuator;
at least one hydraulic accumulator operatively connected to at least one of said first and second servo valves;
a supply of hydraulic fluid within said at least one hydraulic accumulator; and
a source of pressurized gas for pressurizing said supply of hydraulic fluid; wherein said at least one hydraulic accumulator comprises a hydro-pneumatic amplifier comprising a housing having a bore therein with an input port, an output port and a piston disposed in said bore separating said input port from said output port, wherein said supply of hydraulic fluid is contained within said bore in a region between said piston and said output port and wherein said source of pressurized gas is connected to said input port of said hydro-pneumatic amplifier for pressurizing said supply of hydraulic fluid.

10. The ejection seat of claim 9, wherein:
said source of pressurized gas is a pressure vessel with an output port and a normally-closed valve closing said output port.

11. The ejection seat of claim 9, wherein:
said second longitudinal axis lies in a plane normal to said first longitudinal axis and is normal to a plane containing said first longitudinal axis.

12. The ejection seat of claim 11, wherein:
said fixed nozzle of said second rocket motor is oriented such that the thrust of said second rocket motor is oriented along a vector that is substantially at right angles to said second longitudinal axis.

13. The ejection seat of claim 12, further comprising:
a third rocket motor having a fixed nozzle and a substantially cylindrical housing with a third longitudinal axis, said third rocket motor being mounted to said seat by a bearing allowing said third rocket motor to rotate about said third longitudinal axis, said third longitudinal axis being the sole degree of freedom about which said third rocket motor rotates relative to said seat;
a third sensor for determining a rotational position of said third rocket motor relative to said seat; and
a third hydraulic actuator for rotating said third rocket motor about said third longitudinal axis.

14. The ejection seat of claim 13, wherein:
said third longitudinal axis is parallel to the intersection of a plane containing said first longitudinal axis and a plane containing said second longitudinal axis.

15. The ejection seat of claim 14, wherein:
said fixed nozzle of said third rocket motor is oriented such that the thrust of said third rocket motor is oriented along a vector that is substantially at right angles to said third longitudinal axis.

* * * * *

UNITED STATES PATENT AND TRADEMARK OFFICE
CERTIFICATE OF CORRECTION

PATENT NO. : 7,578,472 B2
APPLICATION NO. : 11/445881
DATED : August 25, 2009
INVENTOR(S) : Brad Mastrolia It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Seventh Day of September, 2010

David J. Kappos
*Director of the United States Patent and Trademark Office*